E. R. HOWARD.
LIGHTING SYSTEM FOR AUTOMOBILES.
APPLICATION FILED OCT. 15, 1915.
1,174,154.
Patented Mar. 7, 1916.
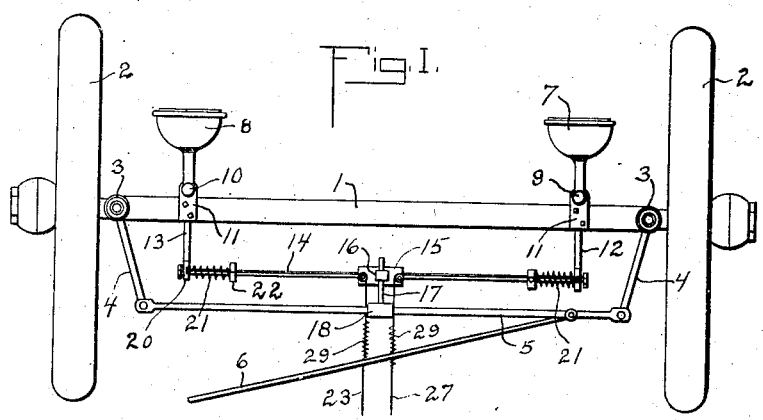
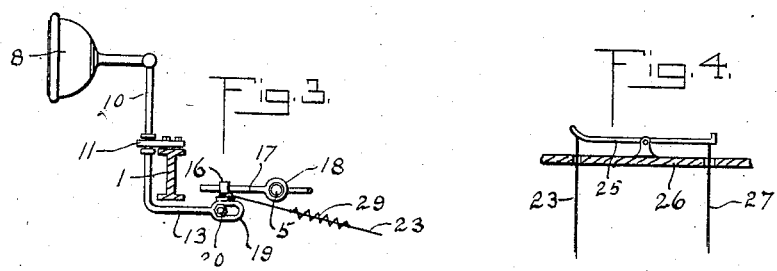
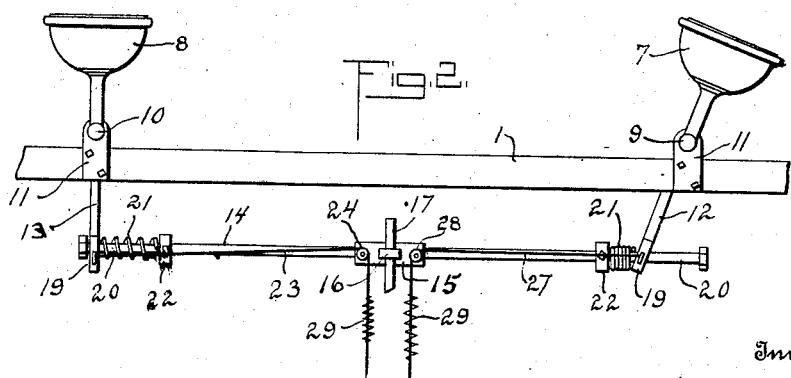
Witness
Frank W. Haskell
Chas. H. Woodburn
Inventor
Earl Ralph Howard,
By Walter N. Haskell,
his Attorney

UNITED STATES PATENT OFFICE.

EARL RALPH HOWARD, OF CHICAGO, ILLINOIS.

LIGHTING SYSTEM FOR AUTOMOBILES.

1,174,154. Specification of Letters Patent. Patented Mar. 7, 1916.

Application filed October 15, 1915. Serial No. 55,928.

*To all whom it may concern:*

Be it known that I, EARL RALPH HOWARD, a citizen of the United States, residing at Chicago, in the county of Cook and State of Illinois, have invented certain new and useful Improvements in Lighting Systems for Automobiles, of which the following is a specification.

My invention has reference to automobiles and similar vehicles, and pertains more specially to novel means for controlling the head-lights of such machines, so that in going around a curve the lights will be made to follow the curve instead of shooting off at a tangent thereto, as is now the case. It is a well-known fact that frequently the most hazardous place in a road is at a curve or sudden turn, and that where the lights are rigidly attached to the machine they are of little or no value when approaching such points. By the use of my invention the lights are caused to turn automatically with the movement of the forward wheels of the car, or they can be manually operated so as to turn one of the lights to the side of the road and leave the opposite light in normal position.

In the drawings: Figure 1 is a plan view of the forward gear of an automobile equipped with my invention. Fig. 2 is a similar view with one of the lights in a diverted position. Fig. 3 is a side elevation of one of the lights and its supporting mechanism. Fig. 4 is a detail, showing the foot-lever 25 in side view.

Corresponding parts are indicated by similar reference numbers throughout the several figures.

1 represents the front axle of an automobile, and 2 the front wheels, pivoted on bearings 3, and operable by means of arms 4 connected with a steering-bar 5, adapted to be actuated by a rod 6 from the steering mechanism, as at present constructed and operated.

A pair of lamps 7 and 8 are mounted on supports 9 and 10 having a pivotal bearing in plates 11 secured to the axle 1. The lower ends of such supports are bent rearwardly into arms 12 and 13, connected with the ends of a bar 14, centrally of which is fixed a plate 15. Mounted on the plate 15 is a sleeve 16 in which is slidably held a short rod 17, one end of said rod being connected rigidly with a collar 18 fixed on the steering-rod 5. A reciprocating movement of the rod 5 in either direction is thereby communicated to the bar 14, causing a corresponding movement of such bar, and moving the supports 9 and 10 so as to turn the lamps 7 and 8 in the same direction as that taken by the wheels 2. The glare of the light from the lamps is thereby diverted in the direction of the turn or curve just ahead of the machine. Upon the wheels 2 being again brought into line with the rear wheels the lamps are automatically returned to their former position, the movement thereof at all times corresponding with that of the wheels.

To give still greater range to the head-lights of the machine the arms 12 and 13 are provided with small loops 19 which are movable inwardly on spindles 20 on the ends of the bar 14, such inward movement being resisted by coiled springs 21 mounted on said spindles between the loops 19 and collars 22 fixed on the bar 14. Connected with the end of the arm 13 is a cord 23 passing around a pulley 24 on the plate 15, thence around another suitable guide, not shown, to the forward end of a foot-lever 25, rockingly mounted on the floor 26 of the car, Fig. 4. A similar cord 27 is connected with the end of the arm 12, from which it passes around a pulley 28 on the plate 15, and thence to the rear end of the foot-lever 25. By pressing the front end of the lever 25 downwardly the cord 27 is operated, turning the lamp 7 to one side of the line of travel, as shown in Fig. 2, while the lamp 8 remains in its normal position. Upon release of the pressure on the lever 25 the spring 21 immediately returns the lamp 7 to its former position. By forcing the rear end of the lever 25 downwardly the cord 23 is actuated, turning the lamp 8 outwardly and throwing the light therefrom at an angle to the line of travel. This is frequently desirable to light up some object at the side of the road, even when the machine is traveling in a straight line. The cords 23 and 27 are provided with coiled springs 29 by means of which the slack in either of said cords is taken up when the other cord is operated by action of the foot-lever.

It will be apparent that the means for operating the lamps by means of the cords 23 and 27 is entirely independent from the automatic action thereof from the movement of the steering-rod but at the same time can be used in conjunction therewith.

For instance, in the event of the lamps and wheels both being turned to the right, the lamp 8 can be returned to its normal position by operation of the cord 23, and with the lamps turned to the left the right hand lamp can be similarly actuated by the cord 27.

While my invention has been herein shown and described as applied to an automobile, there are other places where it can be effectually used by a slight adaptation, such as that of controlling the movement of the headlights of locomotives or electric cars from the movement of the forward axles thereof.

What I claim as my invention, and desire to secure by Letters Patent of the United States, is:

1. In an automobile, the combination with the frame thereof and a pair of wheels pivotally connected with said frame; of a steering-rod adapted to actuate said wheels to direct the same toward one side or the other of the line of travel of said automobile; a pair of lamps pivotally mounted on said frame and provided with operating arms; a bar connecting said arms and operatively connected with said steering rod, to automatically impart to said lamps a movement corresponding to the movement of said wheels; and operative mechanism above the floor of said automobile, connected with said lamp-operating arms, and adapted to operate either of said lamps independently of said automatic actuating devices.

2. In an automobile the combination with the frame thereof of a pair of lamps pivotally supported therein; a bar mounted in said frame and provided with a spindle at each of its ends; arms connected with the pivots of said lamps and having a sliding engagement with said spindles; springs on said spindles tending to hold said arms at the outer ends thereof; a foot-lever rockingly mounted on the floor of said automobile; and cords connecting the ends of said foot-lever with said arms to suitably actuate the same, to divert the rays of light from said lamps outwardly from the line of travel of the automobile.

In testimony whereof I affix my signature in presence of two witnesses.

EARL RALPH HOWARD.

Witnesses:
W. N. HASKELL,
W. F. BROCK.

Copies of this patent may be obtained for five cents each, by addressing the "Commissioner of Patents, Washington, D. C."